(12) United States Patent
McCoy et al.

(10) Patent No.: US 10,742,111 B2
(45) Date of Patent: Aug. 11, 2020

(54) ACTIVE CLAMP POWER CONVERTER AND METHOD OF REDUCING SHOOT-THROUGH CURRENT DURING SOFT START

(71) Applicant: SEMICONDUCTOR COMPONENTS INDUSTRIES, LLC, Phoenix, AZ (US)

(72) Inventors: Bryan Wayne McCoy, Chandler, AZ (US); Ajay Karthik Hari, Scottsdale, AZ (US)

(73) Assignee: SEMICONDUCTOR COMPONENTS INDUSTRIES, LLC, Phoenix, AZ (US)

(\*) Notice: Subject to any disclaimer, the term of this patent is extended or adjusted under 35 U.S.C. 154(b) by 0 days.

(21) Appl. No.: 16/659,022

(22) Filed: Oct. 21, 2019

(65) Prior Publication Data

US 2020/0052579 A1 Feb. 13, 2020

Related U.S. Application Data

(60) Division of application No. 16/035,855, filed on Jul. 16, 2018, now Pat. No. 10,491,104, which is a
(Continued)

(51) Int. Cl.
*H02M 1/36* (2007.01)
*H02M 1/08* (2006.01)
(Continued)

(52) U.S. Cl.
CPC ............... *H02M 1/36* (2013.01); *H02M 1/08* (2013.01); *H02M 1/38* (2013.01); *H02M 3/3353* (2013.01);
(Continued)

(58) Field of Classification Search
CPC ............ H02M 1/08; H02M 1/36; H02M 1/38; H02M 3/335; H02M 3/33507; H02M 3/33553; H02M 3/33569
See application file for complete search history.

(56) References Cited

U.S. PATENT DOCUMENTS 6,154,375 A 11/2000 Majid et al.
6,343,025 B1 1/2002 Nagahara
(Continued)

*Primary Examiner* — Matthew V Nguyen
(74) *Attorney, Agent, or Firm* — Dickinson Wright PLLC

(57) ABSTRACT

An ACF power converter uses a soft start operation to reduce overheating and stress on components. The power converter includes a first transistor and second transistor. A high side driver controls the first transistor, and low side driver controls the second transistor. A first operating potential is provided to the low side driver during a first period of time. The second transistor switches based on an oscillator signal having a first rate of frequency change to generate a second operating potential for the high side driver, while attempting to hold the first transistor in the non-conductive state during a second time period. The first and second transistors switch based on the oscillator signal having a second rate of frequency change during a third time period. The power converter is held in ACF mode and inhibited from changing state for a period of time post soft start.

8 Claims, 4 Drawing Sheets

Related U.S. Application Data continuation of application No. 15/266,005, filed on Sep. 15, 2016, now Pat. No. 10,050,516.

(60) Provisional application No. 62/314,780, filed on Mar. 29, 2016.

(51) Int. Cl.
   *H02M 1/38* (2007.01)
   *H02M 3/335* (2006.01)

(52) U.S. Cl.
   CPC ... *H02M 3/33507* (2013.01); *H02M 3/33569* (2013.01)

(56) References Cited

U.S. PATENT DOCUMENTS

| | | | |
|---|---|---|---|
| 6,856,103 B1 | 2/2005 | Hudson et al. | |
| 7,307,406 B2 | 12/2007 | Shirai et al. | |
| 7,649,755 B2 | 1/2010 | Kogel et al. | |
| 8,724,347 B2* | 5/2014 | Hosotani | H02M 1/36 363/21.04 |
| 10,050,516 B2* | 8/2018 | McCoy | H02M 1/36 |
| 10,491,104 B2* | 11/2019 | McCoy | H02M 3/33507 |
| 2007/0296386 A1 | 12/2007 | Umeki | |
| 2010/0067261 A1 | 3/2010 | Nakanishi | |
| 2010/0157629 A1* | 6/2010 | Yoshikawa | H02M 1/36 363/21.01 |
| 2010/0231297 A1 | 9/2010 | Buitendijk | |
| 2013/0010502 A1 | 1/2013 | Chen | |
| 2013/0121037 A1 | 5/2013 | Peng et al. | |
| 2013/0154589 A1 | 6/2013 | Lethellier | |
| 2014/0062431 A1 | 3/2014 | Yanase et al. | |
| 2015/0077081 A1 | 3/2015 | Ejury et al. | |
| 2018/0287493 A1 | 10/2018 | Riva et al. | |
| 2019/0260282 A1* | 8/2019 | Oh | H02M 1/08 |

* cited by examiner

US 10,742,111 B2

ACTIVE CLAMP POWER CONVERTER AND METHOD OF REDUCING SHOOT-THROUGH CURRENT DURING SOFT START

CLAIM TO DOMESTIC PRIORITY

The present application is a divisional of U.S. patent application Ser. No. 16/035,855, filed Jul. 16, 2018. The '855 Application is a continuation of U.S. patent application Ser. No. 15/266,005, filed Sep. 15, 2016, which claims the benefit of U.S. Provisional Application No. 62/314,780, filed Mar. 29, 2016. Both applications are incorporated herein by reference as if reproduced in full below.

FIELD OF THE INVENTION

The present invention relates in general to semiconductor devices and, more particularly, to an active clamp power converter and method of reducing shoot-through current during soft start.

BACKGROUND

Semiconductor devices are commonly found in modern electronic products. Semiconductor devices vary in the number and density of electrical components. Semiconductor devices perform a wide range of functions such as analog and digital signal processing, sensors, transmitting and receiving electromagnetic signals, controlling electronic devices, power management, and audio/video signal processing. Discrete semiconductor devices generally contain one type of electrical component, e.g., light emitting diode (LED), small signal transistor, resistor, capacitor, inductor, diodes, rectifiers, thyristors, and power metal-oxide-semiconductor field-effect transistor (MOSFET). Integrated semiconductor devices typically contain hundreds to millions of electrical components. Examples of integrated semiconductor devices include microcontrollers, application specific integrated circuits (ASIC), power conversion, standard logic, amplifiers, clock management, memory, interface circuits, and other signal processing circuits.

A power conversion circuit converts an input voltage (AC or DC) to a second regulated direct current (DC) output voltage. The regulated DC output voltage is typically a different value than the input voltage. A power conversion circuit is used for any electronic device functioning with a DC operating voltage that derives its power from an alternating current (AC) source. For example, a television that plugs into an AC wall socket uses a power converter to convert the AC power to DC operating potential for the electronic components in the television. The power conversion circuit is also commonly used for charging the battery of a mobile device, e.g., cell phone and laptop computer.

During initial power-on when the AC or DC input voltage is applied, the components of the power conversion circuit undergo a number of transient states or conditions as the system transitions from zero output voltage to steady-state regulating operation. The transient states during power-on can be stressful on the electronic components of the power conversion circuit. A soft start circuit is commonly used in the power converter to restrict the range of transient states and reduce the stress on the components during power-on, i.e., the soft start circuit slowly brings the power converter from zero output voltage to a steady-state regulating mode.

The power converter can be implemented in a number of configurations. For example, a fixed frequency flyback, quasi-resonant flyback, and active clamp flyback are types of power converter circuits. These flyback power converters all benefit from a soft start circuit, although each topology has individualized requirements. One way to implement soft start is to slowly increase the inductor/transformer current limit from a small value (which restricts the range of component transient conditions) to larger values at a fixed operating frequency and variable pulse width to the switching power transistor until the final regulated DC output voltage is achieved. The slow increase in current limit produces a monotonic output voltage ramp. The ramped inductor/transformer current at fixed operating frequency and variable pulse width to the switching power transistor is sufficient to address many soft start applications. However, the active clamp flyback converter exhibits a number of pushing factors that must be addressed for optimal soft start protection. In particular, the active clamp flyback converter has several distinct start-up time periods that are susceptible to shoot-through current through stacked power transistors causing overheating if not properly controlled. Overheating during startup can degrade components and reduce the reliability over time, resulting in lower mean time between failure of the power converter.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure. The term "semiconductor die" as used herein refers to both the singular and plural form of the words, and accordingly, can refer to both a single semiconductor device and multiple semiconductor devices.

Figure 1:
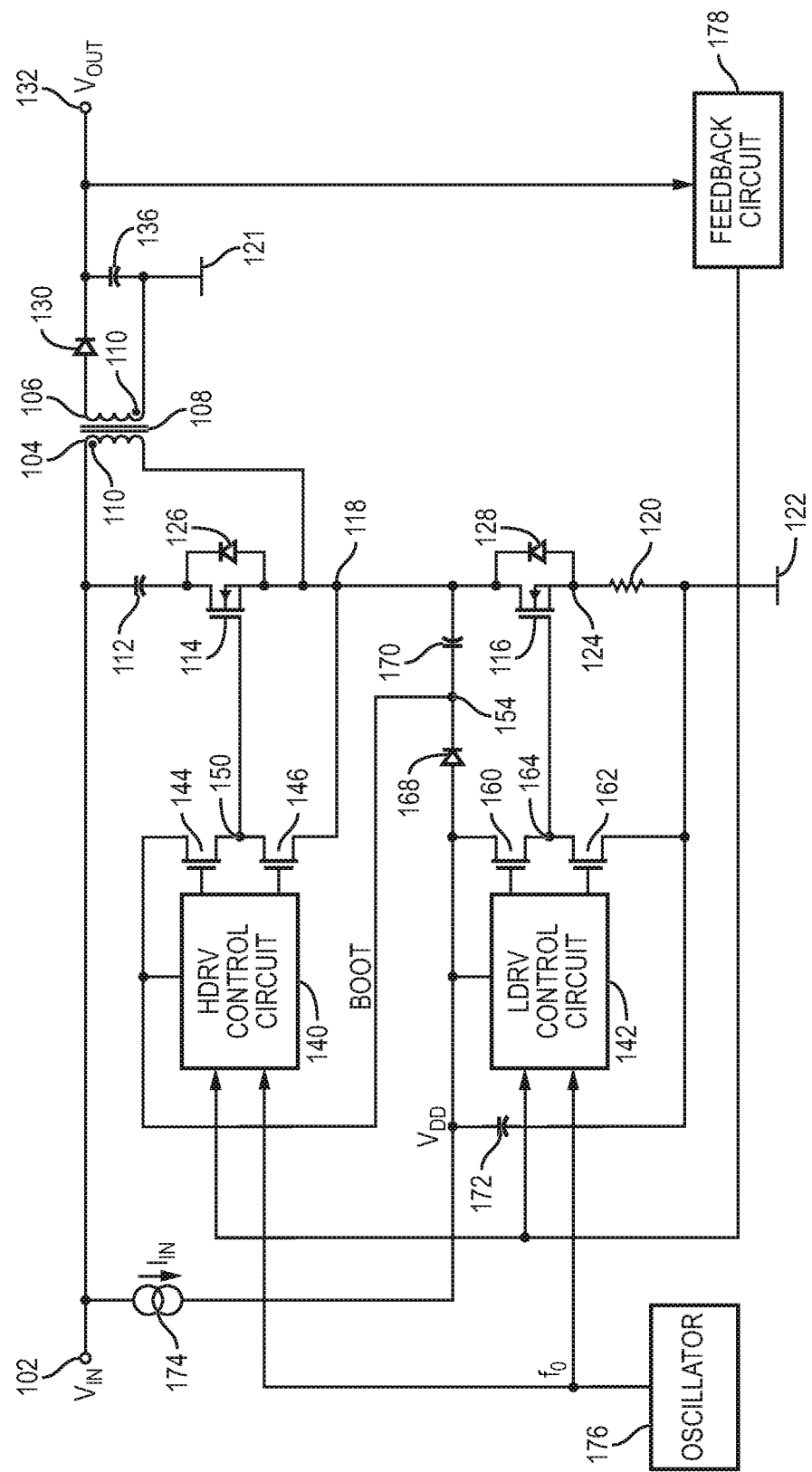
FIG. 1 illustrates a schematic and block diagram of an ACF power converter.

FIG. 1 is a schematic and block diagram of active clamp flyback (ACF) power converter 100. ACF power converter 100 is implemented on a semiconductor die and packaged with an encapsulation and external leads electrically connected to critical circuit nodes. A DC input voltage $V_{IN}$ is applied at terminal 102 as a first external lead of the semiconductor package, which is coupled to a first terminal of inductor 104. Inductor 104 in an input or primary side of transformer 106 and inductor 108 is an output or secondary side of the transformer, shown with polarity dots 110. Energy is recaptured from transformer 108 in capacitor 112 from the source to drain of power transistor 114. The source of power transistor 114 is coupled to the drain of power transistor 116 at node 118. The source of power transistor 116 is coupled through resistor 120 to power supply terminal 121 as a second external lead of the semiconductor package operating at ground potential. Accordingly, power transistors 114-116 are arranged in a stacked configuration, each in a conduction path of the other. A current sense (CS) voltage develops across resistor 120 at node 124 from the current flow through power transistor 116. In one embodiment, transistors 114 and 116 are power MOSFETs and each include an internal body diode 126 and 128, respectively. A second terminal of inductor 104 is coupled to node 118. A first terminal of inductor 106 is coupled through diode 130 to output terminal 132, and a second terminal of inductor 106 is coupled to power supply terminal 121. Capacitor 136 is coupled between output terminal 132 and power supply terminal 121. Output terminal 132 provides a regulated DC output voltage $V_{OUT}$ during steady-state operation of ACF power converter 100.

The regulation of $V_{OUT}$ is achieved with high side driver (HDRV) control circuit 140 and low side driver (LDRV) control circuit 142. HDRV 140 has first and second outputs coupled to the gates of push-pull transistors 144 and 146. The source of transistor 144 and drain of transistor 146 are coupled to the gate of power transistor 114 at node 150. The source of transistor 146 is coupled to node 118, and the drain of transistor 144 is coupled to node 154, labeled as BOOT. BOOT node 154 provides operating potential to the drain of transistor 144. HDRV 140 controls power transistor 114 through transistors 144 and 146. LDRV 142 has first and second outputs coupled to the gates of push-pull transistors 160 and 162. The source of transistor 160 and drain of transistor 162 are coupled to the gate of power transistor 116 at node 164. The source of transistor 162 is coupled through resistor 120 to ground terminal 122. Current source 174 is coupled to $V_{IN}$ and provides current $I_{IN}$ to generate operating potential $V_{DD}$ at the drain of transistor 160, as well as LDRV 142. LDRV 142 controls power transistor 116 through transistors 160 and 162. Capacitor 170 is coupled between node 154 and node 118. Capacitor 172 is coupled between the drain of transistor 160 and ground terminal 122. Programmable oscillator 176 provides a user selectable oscillator frequency $f_o$ to HDRV 140 and LDRV 142.

A semiconductor die includes power transistors 114-116, HDRV and LDRV control circuit 140-142, transistors 144-146 and 160-162, and oscillator 176. Other components may be internal or external to the semiconductor die.

In steady state operation of ACF power converter 100, HDRV 140 and LDRV 142 provide pulses to switch (turn on and turn off) power transistors 114 and 116 in sequence to store energy in inductor 104 and then transfer that energy to inductor 106 and output terminal 132 as output voltage $V_{OUT}$. HDRV 140 and LDRV 142 operate with the oscillator frequency $f_o$ to deliver variable duty cycle pulses to power transistors 114 and 116. The oscillator frequency $f_o$ is selectable, say from 100 kHz to 1 MHz, and the duty cycle of the pulses is controlled with feedback circuit 178 from output terminal 132 back to inputs of HDRV 140 and LDRV 142. The duty cycle of the pulses from HDRV 140 and LDRV 142 to power transistors 114 and 116 is controlled by feedback circuit 178 to regulate $V_{OUT}$ under varying loads and input voltage conditions.

Figure 2:
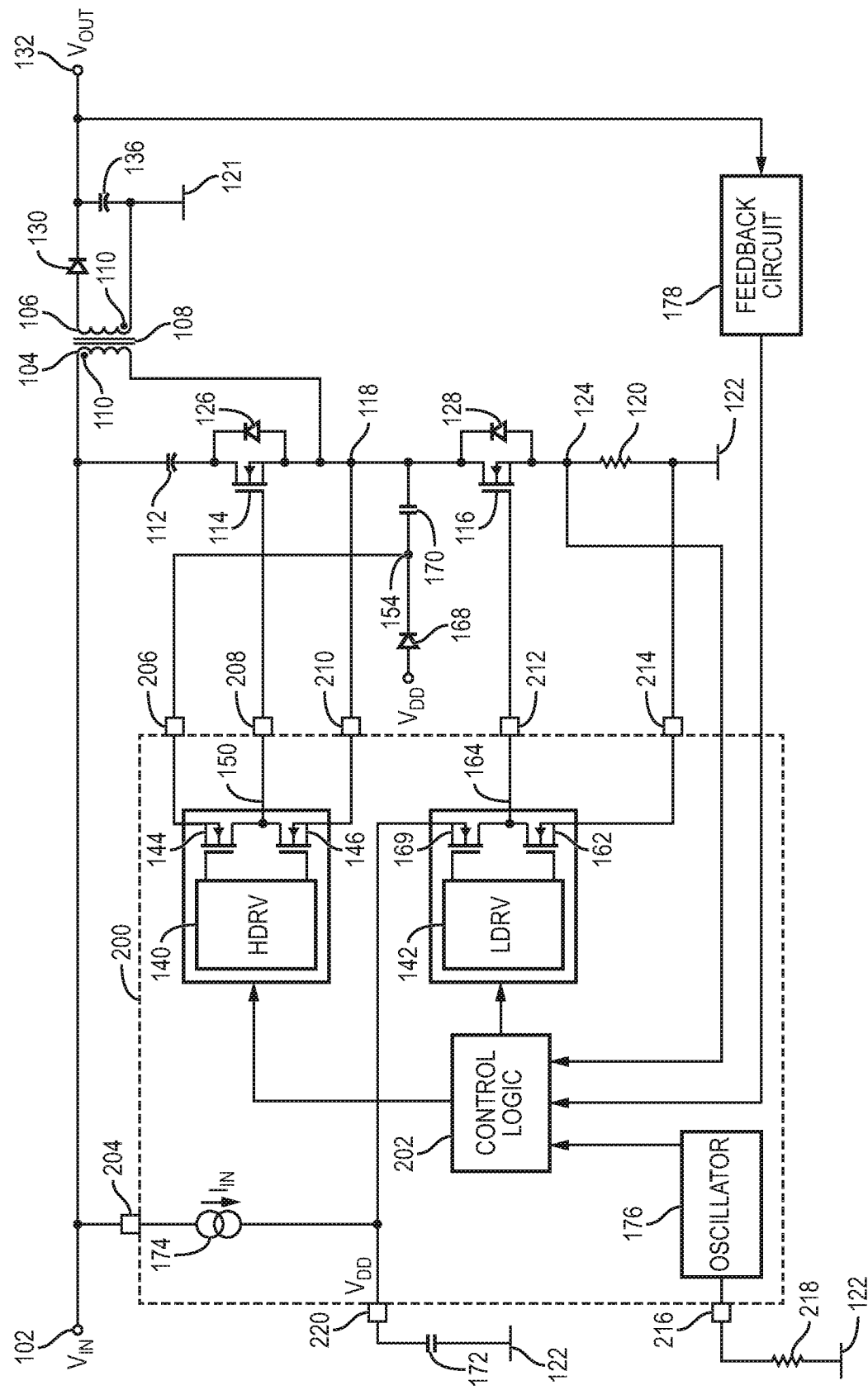
FIG. 2 illustrates another embodiment of the ACF power converter.

FIG. 2 shows an alternate embodiment of the ACF power converter. Components having the same function are assigned the same references numbers from FIG. 1. Semiconductor die 200 includes HDRV 140, LDRV 142, transistors 144-146 and 160-162, current source 174, oscillator 176, and control logic 202. External terminal 204 is coupled to terminal 102 for receiving the input voltage $V_{IN}$. External terminal 206 is coupled to node 154. External terminal 208 is coupled to the gate of power transistor 114. External terminal 210 is coupled to node 118. External terminal 212 is coupled to the gate of power transistor 116. External terminal 214 is coupled to power terminal 122. External terminal 216 is coupled through resistor 218 to power terminal 122. External terminal 220 is coupled through capacitor 172 to ground terminal 122.

Control logic 202 receives a feedback signal representative of $V_{OUT}$ from feedback circuit 178, the CS voltage at node 124, and the oscillator frequency $f_o$ from oscillator 176. Control logic 202 controls driver modulation and timing of HDRV 140 and LDRV 142, as described above.

During start-up from zero output voltage $V_{OUT}$ to steady-state regulating operation, ACF power converter 100 is susceptible to shoot-through current from drain to source of transistor 114 discharging the energy stored in capacitor 112 to ground terminal 122, at times when the stacked power transistors 114-116 are simultaneously in conduction, even if momentarily and partially in conduction. LDRV 142 and transistors 160-162 receive operating potential $V_{DD}$ rather quickly from current source 174. However, the operating potential from BOOT node 154 to transistors 144-146 takes a longer period of time to establish. The conductive state of transistors 114 and 144-146 is at times unstable and indeterminate with no established operating potential from BOOT node 154. The stacked power transistors 114-116 may become simultaneously in conduction causing shoot-through current because bias voltages have not yet been properly established for transistors 144-146 during the transient conditions of start-up, as well as due to poor reverse recovery characteristics of body diode 126. The simultaneous conduction of power transistors 114-116 leads to shoot-through current from drain to source of transistor 114 discharging capacitor 112 to ground terminal 122, which causes overheating and can degrade components and reduce reliability over time.

Figure 3:
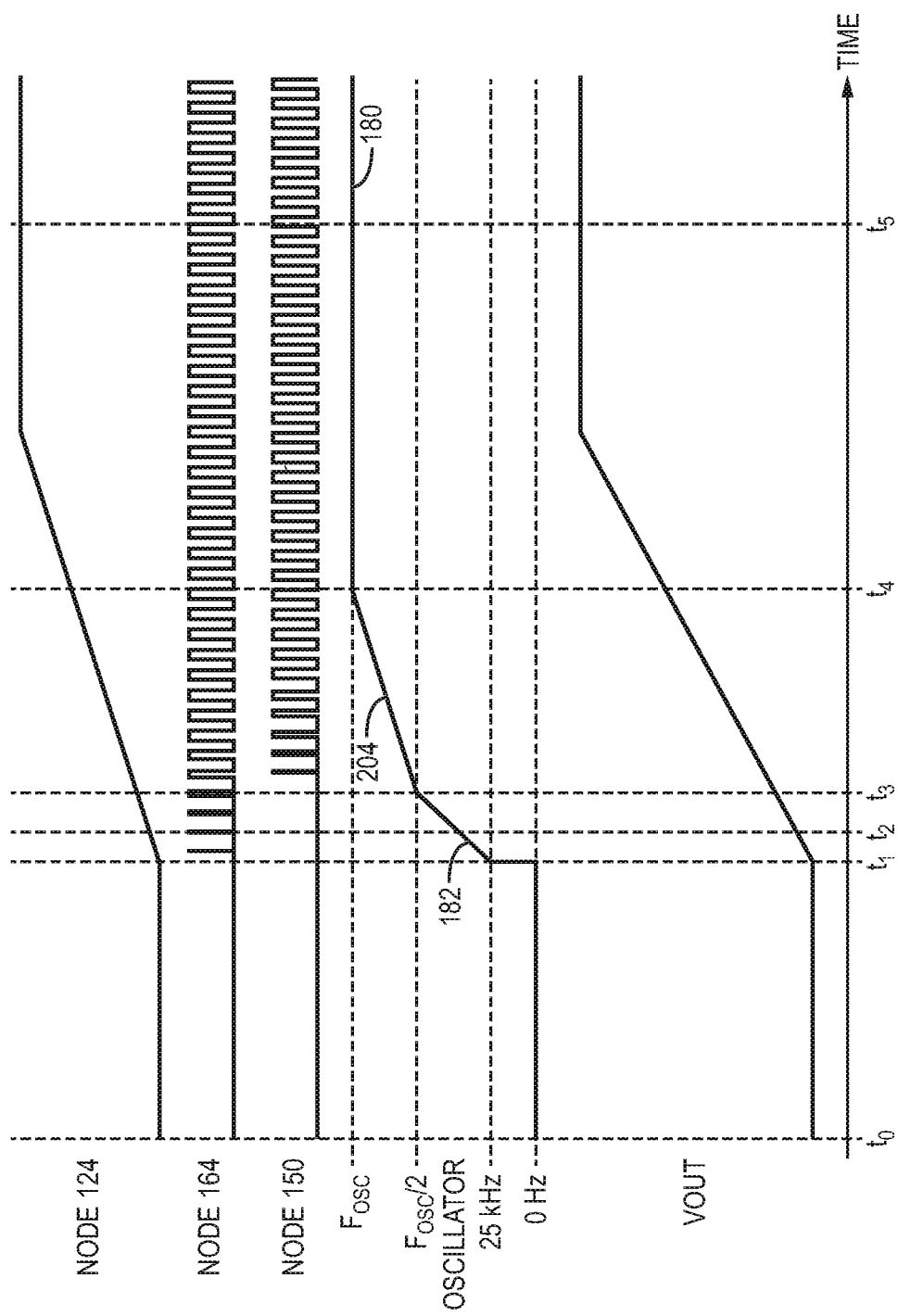
FIG. 3 a timing waveform plot of relevant nodes of the ACF power converter.

HDRV 140 and LDRV 142 provide a soft start function for ACF power converter 100 to prevent or reduce shoot-through current, limit transient conditions, and reduce component stress, and deliver stored energy in capacitor 112 in a controlled way to avoid reliability issues. The soft start function is in part implemented as control logic or programming stored in memory of HDRV 140 and LDRV 142. During start-up, ACF power converter 100 transitions from zero output voltage $V_{OUT}$ to steady-state regulating operation. FIG. 3 is a waveform plot of five relevant time periods of the soft start function for ACF power converter 100. Between times $t_0$ and $t_1$ of FIG. 3, about 500 milliseconds (ms) in duration, the input voltage $V_{IN}$ increases from zero volts to a steady-state value, e.g., ranging from 170-370 volts DC. The magnetizing inductance ramps up current flow through inductor 104 with the applied input voltage $V_{IN}$. The current flow through inductor 104 decreases to zero amps as node 118 settles to the input voltage $V_{IN}$. When node 118 reaches $V_{IN}$, capacitor 170 is not charged, diode 168 is reverse biased, and BOOT node 154 floats with respect to node 118. The oscillator frequency $f_o$ to HDRV 140 and LDRV 142 is programmed to be zero hertz. HDRV 140 produces no pulses at node 150 with zero oscillator frequency and power transistor 114 is intended to remain in a non-conductive state. While transistors 160-162 will have operating voltage $V_{DD}$ from current source 174 sometime between times $t_0$-$t_1$, LDRV 142 produces no pulses at node 164 with the programmed zero oscillator frequency, see node 164 waveform. The output voltage $V_{OUT}$ is zero volts and the CS voltage at node 124 is zero volts.

Capacitor 170 is charged between times $t_1$ and $t_2$ of FIG. 3, which is about 250 microseconds (μs) in duration. The oscillator frequency $f_o$ from oscillator 176 is shown as line 180 and set to a low initial value, say 25 kHz, and then ramps up or increases in frequency with a linear slope or rate of frequency change 182. LDRV 142 and transistors 160-162 produce narrow pulses at node 164, e.g., with an initial duty cycle of 0.5% at 25 kHz and initial on-time of 200 nanoseconds (ns) per cycle for power transistor 116. With operating voltage $V_{DD}$, power transistor 116 conducts for initial short durations and then with slowly increasing and longer durations with a slowly increasing frequency, as the oscillator frequency and pulse duty cycle increase between times $t_1$ and $t_2$. HDRV 140 holds power transistor 114 in a non-conductive state during times $t_1$-$t_2$ to prevent, minimize, or at least reduce shoot-through current from $V_{IN}$ to ground terminal 122.

During the initial several short on-time cycles (e.g. first five pulses) for power transistor 116, the voltage at node 118 is reduced to a value approaching zero volts to forward bias diode 168 and charge capacitor 170, while attempting to avoid shoot-through current by simultaneous conduction through the stacked power transistors 114-116. The output voltage $V_{OUT}$ and the CS voltage begin to rise during times $t_1$-$t_2$. HDRV 140 is programmed to produce no pulses between times $t_1$ and $t_2$ because the operating potential from BOOT node 154 remains unstable or indeterminate until capacitor 170 is fully charged. Capacitor 170 is usually fully charged by time $t_2$. However, even while attempting to hold power transistor 114 in a non-conductive state with no pulses from HDRV 140, the internal logic in HDRV 140 must initialize and settle into steady state operation before pulse are applied. If the internal logic is not allowed to settle, there are conditions where power transistor 114 may be unintentionally biased into a conductive state during the transition of node 118 from the high $V_{IN}$ voltage to the lower voltage level approaching zero volts, resulting in undesired cross conduction between power transistors 114-116 and shoot-through current from drain to source of transistor 114 discharging capacitor 112 to ground terminal 122.

Figure 4:
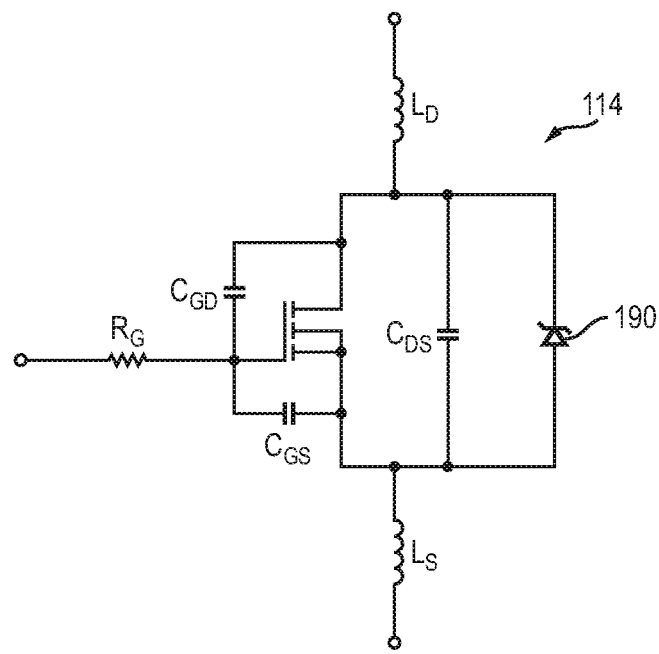
FIG. 4 illustrates internal parasitics of the power transistor.
Figure 5:
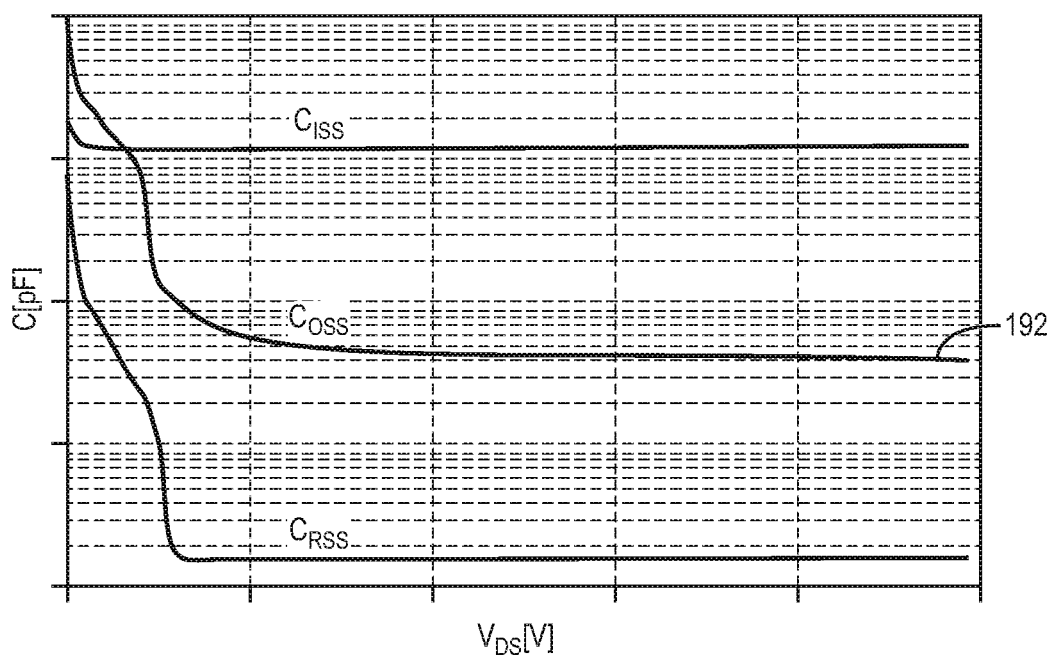
FIG. 5 illustrates a plot of $V_{DS}$ and capacitance of the power transistor.

To understand the likelihood of shoot-through current, FIG. 4 illustrates a model of internal parasitic values of power MOSFET 114. Power MOSFET 114 includes gate resistance $R_G$, gate-drain capacitance ($C_{GD}$), gate-source capacitance ($C_{GS}$), drain-source capacitance ($C_{DS}$), drain inductance ($L_D$), source inductance ($L_S$), and body diode 190. When node 118 changes from zero volts to $V_{IN}$ during times $t_0$-$t_1$, the voltage conducted through body diode 190 of transistor 114 ensures that capacitor 112 is one body diode voltage drop away from $V_{IN}$. When power transistor 116 turns on, the source of transistor 114 is pulled down quickly or, for the present discussion, instantaneously. Equation (1) is helpful in ascertaining if power transistor 114 will have a tendency to turn on when node 118 is pulled low.

$$XC = \frac{1}{2\pi fc} \rightarrow VCOSS = \frac{VIN * \frac{1}{COSS*\pi*f}}{\frac{1}{COSS*\pi*f} + \frac{1}{C112*\pi*f}} \rightarrow VCOSS = \quad (1)$$

$$\frac{VIN * C112}{COSS + C112} \rightarrow VCOSS < Vth, \; Vth > \frac{VIN * C112}{COSS + C112}$$

where:
XC is capacitive reactance
VCOSS is voltage across COSS
COSS is output capacitance of transistor 114
C112 is capacitance of capacitor 112
First consideration is the voltage division between capacitor 112 (C112) and output capacitance (COSS) of power transistor 114. FIG. 5 is a plot of drain-source voltage $V_{DS}$ of power transistor 114 versus capacitance. Since C112 is usually one hundred times (100 nf) the value of COSS (50 pf–10 nf), the voltage division for COSS is large and the majority of the voltage difference between $V_{IN}$ and voltage at node 118 is impressed upon COSS. As shown in FIG. 5, COSS shown as line 192 starts as no more than one-tenth of C112, but quickly reduces allowing almost all of the voltage to be dropped over COSS.

The COSS voltage is divided between $C_{GS}$ and $C_{GD}$, similar to the division of C112 and COSS. $C_{GS}$ is small compared to $C_{GD}$ and as such tends to turn on power transistor 114. As $V_{IN}$ moves higher in voltage, more energy is provided to the gate of power transistor 114 increasing the likelihood of inadvertent conduction. During the first few switching cycles of power transistor 116, it is important to minimize cross conduction and associated stress on the components of ACF power converter 100, given the possibility that power transistor 114 may in fact conduct for brief periods of time.

Understanding the likelihood of cross-conduction helps select the initial pulse width at node 164. The first few pulse widths at node 164 should be long enough, excluding delays and rise time of power transistor 116, so that sufficient current flows to pull down node 118, forward bias diode 168, and begin charging capacitor 170. Correspondingly, the first few pulse widths at node 164 should be made short to minimize the on-time of power transistor 116 and avoid cross-conduction as much as possible during times of inadvertent turn on of power transistor 114. An initial duty cycle of 0.5% at 25 kHz and initial on-time of 200 ns achieves an effective balance for controlling power transistor 116 to pull down node 118 while preventing, minimizing, or reducing shoot-through current and avoiding overstress and overheating of the components of ACF power converter 100. By operating at a lower oscillator frequency $f_o$ during the first several pulses, e.g. five pulses, ACF power converter 100 minimizes energy loss during any shoot-through event. ACF power converter 100 is better able to dissipate heat generated in power transistors 114-116 in the event of inadvertent shoot-through current.

A discontinuous conduction mode (DCM) of ACF power converter 100 occurs between times $t_2$ and $t_3$ of FIG. 3. ACF power converter 100 is held in DCM during times $t_2$-$t_3$. Even though capacitor 170 is fully charged at time $t_2$ and HDRV 140 and transistors 144-146 are capable of driving power transistor 114, HDRV 140 is programmed to produce no pulses at node 150 during DCM operation to provide additional time for the voltage at BOOT node 154 to exceed an under-voltage lockout (UVLO) threshold and further to initialize an internal startup sequence for HDRV 140. A voltage at BOOT node 154 in excess of UVLO ensures enough operating potential to pull down on the gate of power transistor 114, given voltage modulations at node 118 between $V_{IN}$ plus reflective voltage and ground. Accordingly, power transistor 116 actively switches and power transistor 114 is held in a non-conductive state in DCM. To accommodate the variation in driver start-up time, ACF power converter 100 should remain in DCM operation for longer than the longest startup sequence and five switching cycles at the lowest switching frequency. In accordance with equation (2), ACF power converter 100 may remain in DCM operation for 500 µs.

$$T_{DCM} = 5 \times \frac{1}{FSW} + SU_{SEQ} \rightarrow 500 \; \mu s = 5 \times \frac{1}{25 \; kHz} + 300 \; \mu s \quad (2)$$

The oscillator frequency $f_o$ increases to one-half the final oscillator frequency (100 kHz-1 MHz), i.e., 50 kHz-500 kHz, in accordance with linear slope 182 between times $t_2$ and $t_3$. Accordingly, the frequency and duty cycle of the node 164 pulses increase over time. However, the oscillator frequency $f_o$ between times $t_2$ and $t_3$ should be maintained at a relatively low value with the goal of minimizing the on-time of power transistor 116, particularly for the first several node 164 pulses. The low oscillator frequency $f_o$ should achieve zero volt switching of the power transistors and result in less energy dissipation for power transistor 114.

To operate at a higher oscillator frequency $f_o$ of say 500 kHz and achieve zero voltage switching in ACF mode, inductance must be reduced from 65 kHz fixed frequency flyback DCM values. Reducing inductance increases the peak current every switching cycle. ACF power converter 100 should start operation at 25 kHz to satisfy the time $t_1$-$t_2$ criteria and remain in DCM for 500 μs to satisfy $t_2$-$t_3$ criteria. During the 500 μs DCM time, the current limit is steadily increased providing a stable ramping output voltage $V_{OUT}$.

The oscillator frequency $f_o$ should be ramped up during DCM past the first five switching cycles to allow more energy to transfer from the primary side to the secondary side and to minimize the required frequency slewing when in ACF mode. As the oscillator frequency $f_o$ increases, the losses in power transistor 116 also increases. Losses in power transistor 114 also increase with frequency because the body diode stays on for a period of time and conducts peak current that would heat up the device. The DCM frequency should be kept well below the ACF switching frequency, e.g. between 25% and 50% of the full frequency value, to lower power dissipation. The output voltage $V_{OUT}$ and the CS voltage at node 124 continue to increase during times $t_2$-$t_3$.

After 500 μs of DCM time $t_2$-$t_3$ to protect power transistors 114-116 and charge capacitor 170, ACF power converter 100 switches to ACF mode at time $t_3$. In ACF mode between times $t_3$-$t_4$, HDRV 140 produces pulses to switch (turn on and turn off) power transistor 114. LDRV 142 continues producing pulses to switch power transistor 116. The oscillator frequency $f_o$ continues to ramp up but with a lower rate of frequency change, i.e., linear slope or rate of frequency change 204 is less than the linear slope or rate of frequency change 182. LDRV 140 provides small initial pulses for a slow transfer of energy, which was built up in capacitor 170 during DCM. The energy contained in the leakage inductance is recaptured in capacitor 170 during DCM and must be delivered to the load in small increments as to not damage the secondary side diode 130. To engage power transistor 114, small increments of on-time are used to modulate power transistor 114 from off to the complement of the signal provided to LDRV 142 and ACF power converter 100 from DCM to ACF. The modulation of power transistor 114 can be accomplished in many ways, e.g. leading edge modulation where small pulses are applied just before the turn on of power transistor 116 and the duty cycle gradually increases until the compliment of the pulses applied to power transistor 116 are achieved. The modulation could also be achieved by trailing edge modulation in which the small pulses are applied just after the end of pulses to power transistor 116 and time gradually increases until the compliment of the pulses applied to power transistor 116 are achieved.

ACF power converter 100 exhibits a gradual energy transfer to the secondary side of transformer 108 with less stress on power transistors 114-116. The ramping of the frequency can be accomplished coincident with the duty cycle modulation of power transistor 114, or after power transistor 114 duty cycle modulation, but not prior to the duty cycle modulation of the power transistor. If the frequency increases before the duty cycle modulation, the losses of power transistor 114 and diode 126 can become large as they are frequency dependent. The output voltage $V_{OUT}$ and the CS voltage at node 124 continue to increase during times $t_3$-$t_4$.

The oscillator frequency $f_o$ has ramped up and reached its final value $F_{OSC}$ by time $t_4$. HDRVF 140, LDRV 142, and power transistors 114-116 are in full ACF mode although the output voltage $V_{OUT}$ may not have reached its regulation point due to load variation, charging of capacitor 136, and feedback transitional period. Since ACF power converter 100 may take some time to reach steady state regulation with the feedback signal, it is advisable to keep the ACF power converter in a known state of operation. The state of operation at the end of soft start is ACF mode, which coincides approximately with the oscillator frequency $f_o$ reaching its final value $F_{OSC}$ at time $t_4$. The natural state of operation when a heavy load is applied is ACF mode. Since an uncharged capacitor 136 constitutes a heavy load, the natural state of ACF power converter 100 in soft start is ACF mode. Accordingly, ACF power converter 100 is held in the ACF mode after soft start has ended about time $t_4$. During the post soft start, while still in ACF mode, ACF power converter 100 continues 1-D operation of power transistor 114, i.e. inverse of power transistor 116, while allowing the system and the output voltage $V_{OUT}$ to reach steady state. ACF power converter 100 is held in ACF mode, post soft start, and inhibited from changing operational state, until all previously mentioned transitions are completed and the system reaches steady state regulation, i.e. until time $t_5$. That is, ACF power converter 100 is held in ACF mode, post soft start, and does not change state for a period of time after the oscillator signal reaches a maximum frequency and/or after an output voltage of the power converter reaches steady state. Holding ACF power converter 100 in ACF mode, post soft start, provides greater control over the system, e.g. reaching steady state $V_{OUT}$ more quickly, and responding to transients more quickly. Once the predefined period has ended, ACF power converter 100 is free to regulate after time $t_5$. In other embodiments, ACF power converter 100 ends ACF mode at or prior to time $t_4$.

The ACF topology has inherent traits that create switch cross conduction issues, particularly during the first five switching cycles. The thermal rise of power transistors 114-116 in the cross conduction can be minimized with small turn on times for power transistor 116, low initial frequency of operation, and ample time to establish operating potential for transistors 144-146 prior to initiation of switching for power transistor 114. In DCM mode, the oscillator frequency $f_o$ is limited to reduce stress on power transistors 114-116 and other components of ACF power converter 100. When transitioning from DCM to ACF, power transistor 114 slowly modulates the on-time in order to avoid fast initial energy transfer to the secondary side. The oscillator frequency $f_o$ is ramped up slowly so that the output slope of $V_{OUT}$ does not change drastically in order to maintain a monotonic output voltage. The topology should be kept in ACF mode for a time to allow the output voltage to settle and the feedback voltage to reach steady state operation before starting any new transitions.

While one or more embodiments have been illustrated and described in detail, the skilled artisan will appreciate that modifications and adaptations to those embodiments may be made without departing from the scope of the present disclosure.

What is claimed:

1. An active clamp flyback (ACF) power converter comprising:
   a voltage input connection and a voltage output connection;
   a transformer defining a first inductor with first and second leads, and second inductor with first and second leads, the first lead of the first inductor coupled to the voltage input connection, the first lead of the second inductor coupled to the voltage output connection, and the second lead of the second inductor coupled to a secondary-side common;
   a clamp transistor defining a gate, a source, and a drain, the drain of the clamp transistor coupled the first lead of the first inductor by way of a clamp capacitor, and the source of the clamp transistor coupled to a switch node defined by the second lead of the first inductor;
   a main transistor defining a gate, a source, and a drain, the drain of the main transistor coupled the switch node, and the drain of the main transistor coupled to a primary-side common;
   a control circuit coupled to the gate of the clamp transistor, and coupled to the gate of the main transistor, the control circuit to perform soft start of the ACF power converter by being configured to:
      hold the gate of the clamp transistor de-asserted during a first time period;
      apply a first switching signal having a first frequency to the gate of the main transistor during the first time period; and then
      apply a second switching signal having a second frequency to the gate of the main transistor during a second time period, and apply a third switching signal having the second frequency to the gate of the clamp transistor during the second time period.

2. The ACF power converter of claim 1 wherein the control circuit further comprises:
   a diode defining an anode and a cathode, the cathode defining a boot node;
   a capacitor coupled between the boot node and the switch node; and
   a current source coupled between the voltage input connection and the anode of the diode;
   wherein the control circuit is further configured to transition to the second time period after a voltage on the boot node exceeds a threshold.

3. The ACF power converter of claim 2 further comprising:
   a semiconductor die that includes the control circuit;
   a high gate terminal defined by the semiconductor die, the high gate terminal coupled to the gate of the clamp transistor;
   a low gate terminal defined by the semiconductor die, the low gate terminal coupled to the gate of the main transistor; and
   a boot terminal defined by the semiconductor die, the boot terminal coupled to the boot node.

4. The ACF power converter of claim 2 further comprising:
   the control circuit further comprises a high drive circuit and a low drive circuit;
   a first drive transistor defining a gate, a source, and a drain, the drain of the first drive transistor coupled to the boot node, the source of the first drive transistor coupled to the gate of the clamp transistor, and the gate of the first drive transistor coupled to the high drive circuit;
   a second drive transistor defining a gate, a source, and a drain, the drain of the second drive transistor coupled to the gate of the clamp transistor, the source of the second drive transistor coupled to boot node, and the gate of the second drive transistor coupled to the high drive circuit;
   a third drive transistor defining a gate, a source, and a drain, the drain of the third drive transistor coupled to anode of the diode, the source of the third drive transistor coupled to the gate of the main transistor, and the gate of the first drive transistor coupled to the low drive circuit; and
   a fourth drive transistor defining a gate, a source, and a drain, the drain of the fourth drive transistor coupled to the gate of the main transistor, the source of the fourth drive transistor coupled to the primary-side common, and the gate of the fourth drive transistor coupled to the low drive circuit.

5. The ACF power converter of claim 4 further comprising:
   a semiconductor die that includes the high drive circuit, the low drive circuit, and the first through fourth drive transistors;
   a boot terminal defined by the semiconductor die and coupled to the drain of the first drive transistor, the boot terminal coupled to the boot node;
   a high gate terminal defined by the semiconductor die and coupled to the source of the first drive transistor, the high gate terminal coupled to the gate of the clamp transistor;
   a switch node terminal defined by the semiconductor die and coupled to the source of the second drive transistor, the switch node terminal coupled to the switch node;
   a low gate terminal defined by the semiconductor die and coupled to the source of the third drive transistor, the low gate terminal coupled to the gate of the main transistor; and
   a input terminal defined by the semiconductor die and coupled to the drain of the third drive transistor, the input terminal coupled to the voltage input connection.

6. The ACF power converter of claim 1:
   the control circuit is configured to ramp the first frequency at a first rate of change during the first time period; and
   the control circuit is configured to ramp the second frequency at a second rate of change during the second time period.

7. The ACF power converter of claim 6, wherein the second rate of change is lower than the first rate of change.

8. The ACF power converter of claim 1 further comprising a semiconductor die, and wherein the clamp transistor, the main transistor, and the control circuit reside on the semiconductor die.

* * * * *